(12) United States Patent
Gautam et al.

(10) Patent No.: US 12,131,487 B2
(45) Date of Patent: *Oct. 29, 2024

(54) ASSOCIATION AND TRACKING FOR AUTONOMOUS DEVICES

(71) Applicant: Aurora Operations, Inc., Pittsburgh, PA (US)

(72) Inventors: Shivam Gautam, Pittsburgh, PA (US); Brian C. Becker, Pittsburgh, PA (US); Carlos Vallespi-Gonzalez, Pittsburgh, PA (US); Cole Christian Gulino, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/725,879

(22) Filed: Apr. 21, 2022

(65) Prior Publication Data

US 2022/0245950 A1 Aug. 4, 2022

Related U.S. Application Data

(63) Continuation of application No. 16/562,938, filed on Sep. 6, 2019, now Pat. No. 11,348,339.

(Continued)

(51) Int. Cl.
*G06T 7/70* (2017.01)
*G05D 1/00* (2006.01)
(Continued)

(52) U.S. Cl.
CPC ........... *G06T 7/246* (2017.01); *G05D 1/0088* (2013.01); *G05D 1/0231* (2013.01); *G06T 7/20* (2013.01);
(Continued)

(58) Field of Classification Search
CPC .......... G06N 3/08; G06N 20/00; G06N 3/045; G06N 3/04; G06N 3/084; G06N 7/01;
(Continued)

(56) References Cited

U.S. PATENT DOCUMENTS 10,671,076 B1 * 6/2020 Kobilarov .............. G08G 1/166
11,348,339 B2 * 5/2022 Gautam ............... G05D 1/0246
(Continued)

*Primary Examiner* — Quan M Hua
(74) *Attorney, Agent, or Firm* — Dority & Manning, P.A.

(57) ABSTRACT

Systems, methods, tangible non-transitory computer-readable media, and devices associated with object association and tracking are provided. Input data can be obtained. The input data can be indicative of a detected object within a surrounding environment of an autonomous vehicle and an initial object classification of the detected object at an initial time interval and object tracks at time intervals preceding the initial time interval. Association data can be generated based on the input data and a machine-learned model. The association data can indicate whether the detected object is associated with at least one of the object tracks. An object classification probability distribution can be determined based on the association data. The object classification probability distribution can indicate a probability that the detected object is associated with each respective object classification. The association data and the object classification probability distribution for the detected object can be outputted.

21 Claims, 8 Drawing Sheets

Related U.S. Application Data

(60) Provisional application No. 62/886,001, filed on Aug. 13, 2019.

(51) Int. Cl.
  *G06T 7/20* (2017.01)
  *G06T 7/246* (2017.01)
  *G06V 10/764* (2022.01)
  *G06V 10/82* (2022.01)
  *G06V 20/58* (2022.01)
  *G06V 40/10* (2022.01)

(52) U.S. Cl.
  CPC ............ *G06V 10/764* (2022.01); *G06V 10/82* (2022.01); *G06V 20/58* (2022.01); *G06V 40/10* (2022.01); *G06T 2207/30261* (2013.01)

(58) Field of Classification Search
  CPC .......... G06N 3/088; G06N 5/01; G06V 10/82; G06V 20/56; G06V 20/58; G06V 10/764; G06V 20/70; G06V 10/40; G06V 10/454; G06V 10/806; G06V 10/811; G06V 10/25; G06V 10/44; G06V 10/62; G06V 10/762; G06V 10/774; G06V 10/778; G06T 2207/10028; G06T 2207/20081; G06T 2207/20084; G06T 2207/30252; G06T 2207/30261; G06T 7/246; G06T 2207/10016; G06T 15/06; G06T 2210/12; G06T 7/20; G06T 7/50; G06T 7/73; G06T 7/74; G08G 1/166; G08G 1/04; G08G 1/0962; G08G 1/163; G08G 1/202; G08G 1/09623; G08G 1/165
  See application file for complete search history.

(56) References Cited

U.S. PATENT DOCUMENTS

| | | | | |
|---|---|---|---|---|
| 2019/0073553 | A1* | 3/2019 | Yao | ........................ G06N 3/082 |
| 2020/0004259 | A1 | 1/2020 | Gulino | |
| 2020/0225669 | A1* | 7/2020 | Silva | ........................ G06N 20/00 |

* cited by examiner

ASSOCIATION AND TRACKING FOR AUTONOMOUS DEVICES

RELATED APPLICATION

The present application is a continuation of U.S. patent application No. 16/562,938, which was filed Sep. 6, 2019, and which is hereby incorporated by reference herein in its entirety. U.S. patent application No. 16/562,938 is based on and claims benefit of and priority to U.S. Provisional Patent Application No. 62/886,001, which was filed Aug. 13, 2019, and which is hereby incorporated by reference herein in its entirety.

FIELD

The present disclosure relates generally to the operation of autonomous devices including the detection, association, and tracking of objects.

BACKGROUND

Devices, including autonomous vehicles, can receive sensor data that is used to determine the state of objects in an environment surrounding the device. However, the state of objects in the environment can be dynamic and subject to change over time. Additionally, the types of objects detected in the environment can change over time as can their state. As such, the effective operation of a device can be based on the detection and tracking of these objects over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of object association and tracking by a device which can include a vehicle. The computer-implemented method can include obtaining, by a computing system comprising one or more computing devices, input data indicative of a detected object within a surrounding environment of an autonomous vehicle and an initial object classification of the detected object at an initial time interval and one or more object tracks at a plurality of time intervals preceding the initial time interval. The computer-implemented method can include generating, by the computing system, association data based at least in part on the input data and one or more machine-learned models. The association data can indicate whether the detected object is associated with at least one of the one or more object tracks. The computer-implemented method can include determining, by the computing system, an object classification probability distribution based at least in part on the association data. The object classification probability distribution can indicate, for a plurality of object classifications, a probability that the detected object is associated with each respective object classification. Furthermore, the computer-implemented method can include outputting, by the computing system, the association data and the object classification probability distribution for the detected object.

Another example aspect of the present disclosure is directed to a computing system including: one or more processors; and a memory including one or more tangible non-transitory computer-readable media. The memory can store computer-readable instructions that, when executed by the one or more processors, cause the one or more processors to perform operations. The operations can include obtaining input data indicative of a detected object within a surrounding environment of an autonomous vehicle, an initial object classification of the detected object, and one or more object tracks. The operations can include generating association data based at least in part on the input data and one or more machine-learned models, wherein the association data indicates whether the detected object is associated with at least one of the object tracks. The operations can include determining an object classification probability distribution based at least in part on the association data when the association data indicates that the detected object is associated with at least one of the object tracks. The object classification probability distribution can indicate, for a plurality of object classifications, a probability that the detected object is associated with each respective object classification. Furthermore, the operations can include controlling an operation of the autonomous vehicle based at least in part on the association data and the object classification probability distribution for the detected object.

Another example aspect of the present disclosure is directed to an autonomous vehicle including: one or more processors; a memory comprising one or more tangible non-transitory computer-readable media, the memory storing computer-readable instructions that when executed by the one or more processors cause the computing system to perform operations. The operations can include obtaining input data indicative of a detected object within a surrounding environment of an autonomous vehicle and an initial object classification of the detected object at an initial time interval and one or more object tracks at a plurality of time intervals preceding the initial time interval. The operations can include generating association data based at least in part on the input data and one or more machine-learned models. The association data can indicate that the detected object is associated with at least one of the one or more object tracks. The operations can include determining one or more object states and one or more object state uncertainties for the detected object based at least in part on the association data for the detected object. The operations can include determining one or more motion state probabilities for the detected object based at least in part on one or more changes in the one or more object tracks over the plurality of time intervals. Each of the one or more motion state probabilities can be associated with a probability that the detected object is associated with a motion state. Furthermore, the operations can include generating one or more tracked object outputs based at least in part on the one or more object states, the one or more object state uncertainties, and the one or more motion state probabilities.

Other example aspects of the present disclosure are directed to other systems, methods, vehicles, apparatuses, tangible non-transitory computer-readable media, and devices for object association and tracking by a device.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
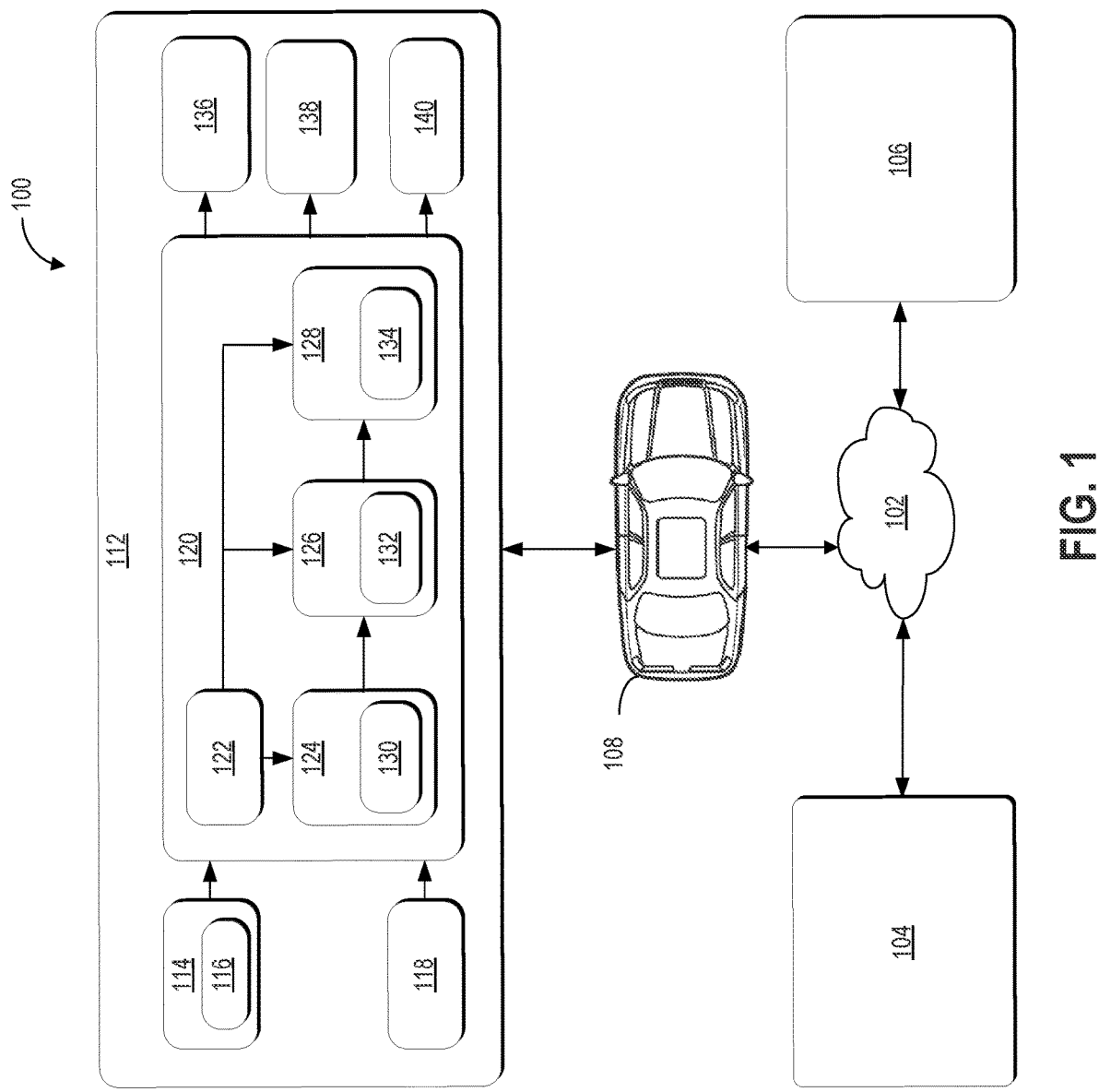
FIG. 1 depicts a diagram of an example system according to example embodiments of the present disclosure.

Example aspects of the present disclosure are directed to the association and tracking of objects in an environment. The disclosed technology can be used to associate and track objects (e.g., pedestrians, cyclists, and motor vehicles) proximate to a vehicle such as, for example, an autonomous vehicle. In particular, the disclosed technology can associate and track objects by using machine-learned models that are trained to classify objects and thereby more accurately associate detected objects with object tracks. As a result, the incidence of association errors, such as when the classification of a detected object changes over time, can be reduced.

The disclosed technology can be implemented by a variety of computing systems that associate and track detected objects in an environment. In particular, the disclosed technology can be used as part of a computing system that more accurately associates and tracks detected objects in the environment around an autonomous vehicle, thereby allowing for more effective control over the movement of the autonomous vehicle.

Furthermore, the disclosed technology can include an association computing system that is configured to perform the various operations associated with the association and tracking of detected objects. In some embodiments, the association computing system can be associated with an autonomy system of an autonomous vehicle that can include a perception system, a prediction system, and/or a motion planning system. The association computing system can process, generate, modify, and/or access (e.g., send, and/or receive) data and/or information associated with the autonomy system of the autonomous vehicle. For example, in an environment with a mixture of pedestrians, cyclists, and automobiles, the association computing system can reduce association errors, such as when a detected cyclist is incorrectly associated with a pedestrian track.

By way of further example, the association computing system can access data including input data associated with one or more locations of objects in an environment detected by sensors of a vehicle associated with the association computing system. The input data can be used as an input to machine-learned models that are configured to generate outputs including association data that provides accurate associations of detected objects with object tracks that can be used by the autonomy system of an autonomous vehicle. Additionally, the disclosed technology can jointly associate and track objects, which can result in an improvement in the accuracy and speed of both association and tracking. Furthermore, the disclosed technology can leverage the use of long short-term memory (LSTM) models that are configured to selectively update hidden states and thereby improve association performance. Accordingly, the disclosed technology allows for more accurate and effective association of detected objects with object tracks.

The association computing system can be configured to obtain data which can include input data. Obtaining the data can include accessing, receiving, and/or retrieving the data from a local and/or remote source (e.g., a storage device that is part of the association computing system). The input data can be indicative of or include information associated with a detected object. In some embodiments, the input data can be based at least in part on one or more sensor outputs from one or more sensors including one or more light detection and ranging (LiDAR) devices, one or more cameras, one or more radio detection and ranging (radar) devices, one or more sonar devices, and/or one or more thermal sensors.

Furthermore, the detected object can be an object that is within an environment that is detected by one or more sensors associated with the association computing system. For example, the detected object can be an object in an environment detected by one or more sensors associated with an autonomous vehicle.

Further, the input data can include information associated with an initial object classification of the detected object at an initial time interval and one or more object tracks at a plurality of time intervals preceding the initial time interval. For example, the input data can include information classifying a detected object as a vehicle and indicating the location of the vehicle over a two second time period including twenty time intervals with a duration of one-tenth of a second each.

The association computing system can be configured to perform joint association across multiple classifications of objects. In some embodiments, the association computing system can generate association data that indicates whether the detected object is associated with at least one of the one or more object tracks, based at least in part on the input data and/or one or more machine-learned models. For example, the input data can be provided as an input to the one or more machine-learned models that have been configured and/or trained to receive the input and generate an output including the association data.

The one or more machine-learned models can be configured to use one or more features included in the input data to generate their respective outputs. The one or more features of the input data can include a detected object's velocity, heading, time the detected object was tracked, physical dimensions, distance to the most recent detection of a tracked object, and/or detection variance. The one or more machine-learned models can be configured and/or trained to use input data that includes multiple object classifications. For example, the one or more classifications can include a first classification and/or a second classification. Further, the first classification can be a bicycle classification (e.g., the detected object is classified as a bicycle) and the second classification can be a pedestrian classification (e.g., the detected object is classified as a pedestrian). In this way, the disclosed technology can be used to distinguish between a pedestrian walking past a parked bicycle and a cyclist riding a bicycle.

The one or more machine-learned models can generate one or more outputs that include a variety of information. For example, the association computing system can be configured to determine an object classification probability distribution based at least in part on the association data. The object classification probability distribution can indicate, for a plurality of object classifications, a probability that the detected object is associated with each respective object classification. For example, the object classification probability distribution for a detected object can indicate a ninety-five percent probability that the detected object is a vehicle, a four percent probability that the detected object is a cyclist, and one percent probability that the detected object is a pedestrian.

In some embodiments, an association score can be included in the association data or determined based at least in part on the association data. Further, the association score can be associated with the detected object. The association score can indicate whether a detected object is associated with an object track of the one or more object tracks. In some embodiments, the association score can be associated with a probability or likelihood that a detected object is associated with an object track. For example, the association score can be positively correlated with the probability that a detected object is associated with an object track, such that a higher score is correlated with a high probability that a detected object is associated with an object track. By way of further example, an association score can include a numeric score ranging from zero to one-hundred in which a higher score (e.g., a score closer to one-hundred) is associated with a higher probability that a detected object is associated with an object track and a lower score is associated with a lower probability that a detected object is associated with an object track. The association score can have a linear or non-linear relationship with the probability that a detected object is associated with an object track.

In some embodiments, determining the association score can be based at least in part on proximity of the detected object to each of the one or more object tracks. The proximity of the detected object to each of the one or more object tracks can be positively correlated with the association score. For example, the association score can be greater when a detected object is closer to an object track than when it is further away from an object track. By way of further example, the association score can be high when the detected object is within ten centimeters of an object track and low when the detected object is twenty meters away from the object track.

In some embodiments, the association computing system can be configured to determine whether a detected object is associated with an object track based at least in part on the association score that is associated with the detected object. Further, the determination that a detected object is associated with an object track can be based at least in part on the association score satisfying one or more association criteria. Satisfying the one or more association criteria can include the association score for a detected object exceeding a predetermined association score threshold, such that a detected object is determined to be associated with an object track when the association score for the detected object exceeds the association score threshold. In some embodiments, when multiple detected objects are determined to be associated with the same object track, the detected object that is associated with the highest score can be determined to be associated with the object track and the other detected objects can be determined not to be associated with the object track.

In some embodiments, when the association score for a detected object is less than a predetermined association score threshold, the detected object can be determined not to be associated with an object track.

The association computing system can be configured to output the association data and the object classification probability distribution for the detected object. For example, the association computing system can generate output data that includes the association data and the object classification probability distribution. In some embodiments, the output of the association computing system can be formatted and/or encoded so that it is usable by one or more other computing systems including an autonomy computing system of an autonomous vehicle.

In some embodiments, the object classification probability distribution can include a set of classes (e.g., pedestrian, automobile, or cyclist) and a corresponding set of probabilities that a detected object is associated with a class. For example, the object classification probability distribution for a detected object can include a one percent probability that a detected object is a pedestrian, a seventy percent probability that the detected object is an automobile, and a twenty-nine percent probability that the detected object is a cyclist.

In some embodiments, the object classification probability distribution can be based at least in part on the association data. For example, the association data can indicate the motion of a detected object over the most recent time interval during which the object was detected. Further, the motion of the object can correspond to a certain object classification, such that objects with a certain velocity, acceleration, and/or pattern of movement are more likely to belong to a corresponding class.

In some embodiments, when a detected object is determined to be associated with an object track, the association computing system can update the object classification probability distribution for the detected object. Further, the association computing system can re-classify a detected object that was previously classified as being in a different class. For example, following the output of the object classification probability distribution for a detected object that was previously classified as being a motorcycle, the detected object can be reclassified as a cyclist.

The one or more machine-learned models can be trained based at least in part on evaluation of a loss function that is associated with training data. In particular, the one or more machine-learned models can access training data that includes ground-truth detected objects and ground-truth object tracks that are used to train the one or more machine-learned models. After successive iterations of performing operations on the training data and determining the loss, the computing system can adjust parameters of each of the one or more machine-learned models based on the loss. Furthermore, parameters of each of the one or more machine-learned models can be weighted in proportion to their contribution to decreasing the loss so that parameters that contribute more to reducing the loss are weighted more heavily. As such, the computing system can generate more effective machine-learned models that can be used to more accurately associate detected objects with object tracks.

In some embodiments, the computing system can access one or more machine-learned models that have been at least partly generated and/or trained using training data indicative of a plurality of detected objects and/or object tracks. The detected objects and/or object tracks can include cyclists, pedestrians, automobiles, motorcycles, and/or buses. The detected objects and/or object tracks can have a plurality of features including physical dimensions, shapes, and/or motion states that are associated with a respective plurality of classified object labels. In some embodiments, the plurality of features can be extracted from training data that includes a plurality of images associated with one or more sensor outputs from one or more sensors that detect objects. When the one or more machine-learned models have been trained, the one or more machine-learned models can associate some of the plurality of features with one or more of the plurality of classified object labels that are used to associate, classify, and/or track objects including objects that were not included in the plurality of objects included in the training data.

In some embodiments, any of the one or more machine-learned association models can be configured and/or trained to generate one or more hidden states that store one or more states of the detected object over time. Further, the association computing system can update the one or more hidden states when the detected object is determined to be associated with at least one of the object tracks. Further, the one or more hidden states can be associated with one or more features of the detected object including a velocity, acceleration, location, position, and/or physical dimensions of the detected object.

In some embodiments, the association computing system can discard the one or more hidden states when the detected object is determined not to be associated with at least one of the object tracks. In some embodiments, the association computing system can use one LSTM per tracked object. In some embodiments, updating the one or more hidden states can be performed when the association score is above a threshold. For example, the one or more hidden states can be updated when the association score is above a threshold that corresponds to a ninety-five percent probability that an object is associated with an object track. By way of further example, when the association score in the range of one to one-hundred is positively correlated with a probability that a detected object is associated with an object track, and the threshold is sixty (e.g., sixty indicating a sixty percent probability that a detected object is associated with an object track), the one or more hidden states can be updated when the association score is above sixty.

In some embodiments, discarding the one or more hidden states can be performed when the association score is below a threshold. For example, the one or more hidden states can be discarded when the association score is below a threshold that corresponds to a ninety-five percent probability that an object is associated with an object track. By way of further example, when an association score in the range of one to one-hundred is positively correlated with a probability that a detected object is associated with an object track, and the threshold is seventy (e.g., a score of seventy indicating a seventy percent probability that a detected object is associated with an object track), the one or more hidden states can be discarded when the association score is below seventy.

In some embodiments, the association computing system can determine one or more object states and/or one or more object state uncertainties for the detected object. The one or more object states can include at least one of a velocity, acceleration, a heading, and/or a position of each of the one or more objects. The one or more object state uncertainties can be associated with an uncertainty or accuracy of each of the one or more object states. The one or more object states and/or the one or more object state uncertainties can be based at least in part on the association data for the detected object. For example, the one or more machine-learned models can use the association data (which includes multiple measurements of the position of a detected object) as an input and determine that the velocity of a detected object is five meters per second with an uncertainty of plus or minus zero point three meters per second, or stated differently, the velocity of the detected object is determined to be between four point seven meters per second and five point three meters per second.

In some embodiments, the output (e.g., association data) of the association computing system can be used by an object tracking system. For example, the object classification probability distribution can be used by an object tracking system to more effectively classify tracked objects. Further, the association computing system can use various approaches including greedy matching and/or extended Kalman filters to associate detected objects with object tracks. For example, the association computing system can perform one or more greedy matching operations to determine that detected objects with higher association scores are associated with object tracks before the detected objects with lower association scores.

In some embodiments, the output (e.g., association data) of the association computing system can include one or more motion state probabilities for the detected object and/or the one or more tracked objects. Each of the one or more motion state probabilities can be associated with a probability that the detected object is associated with a motion state. The motion state can include at least one of: a stationary state in which a velocity of the detected object is zero over the plurality of time intervals; a cruising state in which the velocity of the detected object is constant over the plurality of time intervals; and/or a maneuvering state in which an acceleration of the detected object varies over the plurality of time intervals. By way of further example, a detected object that does not change location over the plurality of time intervals can be determined to be in the stationary state. Further, a vehicle travelling at a constant velocity of thirty meters per second over the plurality of time intervals can be determined to be in the cruising state. Furthermore, a detected object (e.g., a vehicle) that accelerates and decelerates as it swerves through traffic can be determined to be in the maneuvering state.

For example, the association computing system can determine that the motion state for a detected object is stationary based on the detected object being stationary for the past twenty seconds and that the motion state probability of the detected object being stationary is ninety-nine percent. In some embodiments, determining the one or more motion state probabilities can be based at least in part on use of an extended Kalman filter (EKF). For example, the extended Kalman filter can receive one or more portions of the association data as an input and output the one or more motion state probabilities.

In some embodiments, the association computing system can be configured to generate one or more tracked object outputs based at least in part on the one or more object states, one or more object state uncertainties, and the one or more motion state probabilities. The one or more tracked object outputs can include tracked object data indicating the location, position, heading, velocity, and/or acceleration of a tracked object that can be used by a motion prediction system to predict the motion of the tracked object. For example, the vehicle computing system can generate tracked object data including the one or more tracked object outputs. Further, the tracked object data generated by the vehicle computing system can then be used as an input for a motion prediction system that is implemented by the vehicle computing system.

In some embodiments, the association data can be based at least in part on the one or more motion state probabilities and an estimator configured to receive the one or more motion state probabilities as input. For example, the estimator can be configured to receive the one or more motion state probabilities and one or more portions of the association data including the association score, the one or more object states, and/or the one or more object state uncertainties. Further, the estimator can generate an output including an estimated state for a detected object. The estimated state of the detected object can be used to determine the one or more tracked object outputs, which in some embodiments, can be provided for use by a motion tracking system. In some embodiments, the estimator can include an Interactive Multiple Model (IMM) tracker.

Furthermore, the output of the association computing system can be used to control operation of an autonomous vehicle. For example, the association computing system can control operation of an autonomous vehicle based at least in part on the association data and/or the object classification probability distribution for the detected object. For example, the association data and/or the object classification probability distribution can be used by a motion tracking system of an autonomous vehicle to determine the paths of detected objects in the environment of the autonomous vehicle. The steering system of the autonomous vehicle can be controlled based at least in part on the paths of the detected objects.

In some embodiments, controlling the operation of the autonomous vehicle can include determining one or more future locations of the detected object based at least in part on the tracked object output. For example, the association computing system can use the object classification probability distribution to determine that a detected object is a pedestrian, which can be used to determine the one or more future locations of the pedestrian (e.g., a predicted path/trajectory of the pedestrian).

In some embodiments, controlling the operation of the autonomous vehicle can include planning a motion of the autonomous vehicle based at least in part on the one or more future locations of the detected object. For example, the autonomous vehicle's motion planning system can use the association data and/or the object classification probability distribution as inputs that are used to determine a motion plan for the autonomous vehicle based at least in part on the one or more future locations of a detected object (e.g., a pedestrian).

In some embodiments, the association computing system can control the autonomous vehicle based at least in part on one or more tracked object outputs. For example, the one or more tracked object outputs can be used by an autonomy system of the autonomous vehicle to determine and control the travel path of the autonomous vehicle based at least in part on the predicted motion of the tracked object.

The systems, methods, devices, and non-transitory computer-readable media in the disclosed technology can provide a variety of technical effects and benefits to the overall operation of the device and the association of detected objects and object tracks in particular. By more effectively associating detected objects and object tracks in an environment through use of one or more machine-learned models the disclosed technology can provide various benefits including a reduction in tracking errors due to improper association and tracking, improved customizability and scalability of the association system, reduced wear and tear on a vehicle, greater fuel efficiency, improved safety, and/or an overall improvement in the utilization of computational resources that can result from joint association and tracking.

Example systems implemented in accordance with the disclosed technology can achieve significant improvements including a reduction in the number of association and/or tracking errors as a result of a reduction in average object association error and the number of predicted association outliers. Further, the use of LSTM models, which can be configured to store states of objects at past time intervals in memory, can further improve the association and tracking of objects over time. Additionally, the improvements in efficiency and performance of the disclosed technology can result in a greater efficiency of using computational resources to associate and track objects.

Furthermore, the machine-learned models of the disclosed technology can be more readily adjusted via retraining on a new and/or modified set of training data than a rules-based system that requires burdensome, manual re-writing of a set of rules. By way of example, in the case of manually created object association rules, a rule designer may need to painstakingly derive heuristic models of how different objects may exhibit different properties and/or attributes in different scenarios. Further, the use of manually created rules runs the risk of not effectively addressing a comprehensive range of situations that a device using the rules may encounter in actual use. By contrast, the disclosed technology, through use of machine-learned models, can train a model on training data, which can be done at a scale proportional to the available resources of the training system including the simulation of more scenarios (e.g., billions of scenarios) than could be performed manually. Additionally, the machine-learned models of the disclosed technology can easily be revised as new training data is made available. As such, use of machine-learned models trained on training data including ground-truth detected objects and ground-truth object tracks can provide a scalable and customizable solution.

The disclosed technology can also improve the operation of a vehicle by reducing the amount of wear and tear on vehicle components through earlier and more accurate association of detected objects with object tracks. For example, more accurate object association and the resulting improvement in object tracking can result in more gradual adjustments in the vehicle's travel path that can be performed based on the more accurate object association for objects in the environment surrounding the vehicle. By way of further example, more efficient object association can result in more lead time for an autonomous vehicle's navigation system, resulting in a smoother and safer ride with a reduction in the number of sudden stops that impose strain on a vehicle's engine, braking, and steering systems. Additionally, faster and more accurate object association can improve the comfort of a passenger when the vehicle is in transit due to smoother adjustments by the vehicle that result from more accurate motion flow estimation.

Additionally, more effective object association can allow for an improvement in safety for passengers inside a vehicle as well as for those outside of the vehicle including pedestrians, cyclists, and/or passengers of other vehicles. For example, by more accurately and efficiently associating detected objects with object tracks the disclosed technology can allow for more accurate and efficient operation of an autonomous vehicle's motion planning system which can be used to more create motion paths for the autonomous vehicle and avoid unintentional contact with objects outside the vehicle. Furthermore, the improvements in object tracking can result in a reduction in fuel and/or energy usage by the autonomous vehicle.

Accordingly, the more effective object association and object tracking of the disclosed technology allows for a host of improvements including: a reduction in tracking errors due to incorrect object association and/or object tracking; improved customizability and scalability of the association system; reduced wear and tear on a vehicle; greater fuel efficiency; improved safety; and/or an overall improvement in the utilization of computational resources that can result from joint association and tracking.

With reference now to FIGS. 1-9, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions that can be performed by the one or more remote computing devices 106 and/or the vehicle computing system 112. Furthermore, the operations computing system 104 can perform one or more operations and/or functions including accessing input data and/or sensor data that can include information associated with a detected object, an initial object classification of the detected object at an initial time interval, and/or one or more object tracks at a plurality of time intervals preceding the initial time interval; generating association data based on the input data and/or sensor data and one or more machine-learned models; determining an object classification probability distribution based at least in part on the association data; and outputting the association data and/or the object classification probability distribution for the detected object.

In some embodiments, the one or more operations and/or functions performed by the operations computing system 104 can include controlling the operation of a device (e.g., an autonomous vehicle) based at least in part on the association data and/or the object classification probability distribution.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned models that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude, longitude, and/or altitude of an object detected by the one or more sensors 114 of the vehicle 108), the state of a vehicle (e.g., the velocity, acceleration, heading, and/or location of the vehicle 108), or the state of objects external to a vehicle (e.g., the physical dimensions, velocity, acceleration, heading, location, shape, and/or appearance of objects external to the vehicle).

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the input data, the sensor data, the training data, and/or the one or more machine-learned models that are stored in the operations computing system 104.

The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a: ground-based vehicle which can include an automobile, a motorcycle, a truck, a bus, a train, a tram, a tracked vehicle, a light electric vehicle, a moped, a scooter, and/or an electric bicycle; an aircraft which can include an airplane, a drone aircraft, a vertical take-off and landing (VTOL) craft, and/or helicopter; a boat; a submersible vehicle which can include a submarine; an amphibious vehicle; a hovercraft; a robotic device including a bipedal, wheeled, or quadrupedal robotic device; and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions that can be performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including any of the operations and/or functions that can be performed by any of the operations computing system 104, and/or the one or more remote computing devices 106. Furthermore, the one or more memory devices of the vehicle computing system 112 can be used to store data including the input data, the sensor data, the training data, and/or the one or more machine-learned models that are stored in the operations computing system 104.

Furthermore, the vehicle computing system 112 can perform one or more operations associated with the control, exchange of data, and/or operation of various devices and systems including autonomous devices, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the input data, sensor data 116 associated with one or more objects that are proximate to the vehicle 108 (e.g., within range or a field of view of one or more of the one or more sensors 114). The one or more sensors 114 can include one or more LiDAR systems, one or more radar systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, cyclists, vehicles, bicycles, buildings, roads, sidewalks, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
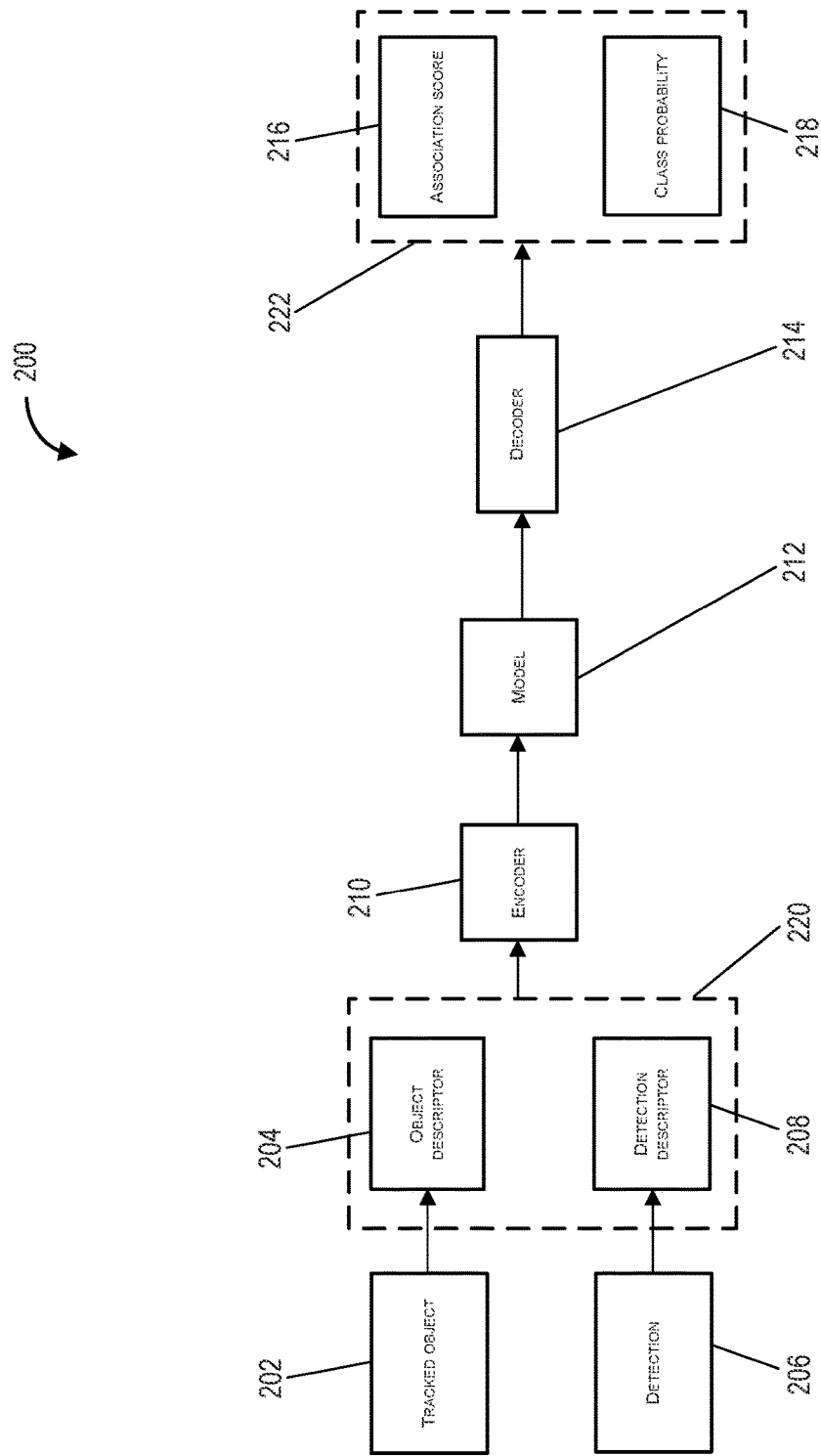
FIG. 2 depicts an example aspect of an association computing system according to example embodiments of the present disclosure.

FIG. 2 depicts a diagram of an example technique for association and tracking according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of an association and tracking technique 200 including a tracked object 202, an object descriptor 204, a detected object 206, a detection descriptor 208, an encoder 210, a machine-learned association model 212, a decoder 214, an association score 216, a class probability 218, joint detection and tracking output 220, and association data 222.

The tracked object 202 can include an object that is being tracked over some number of time intervals. For example, the tracked object 202 can be a vehicle in an environment that is detected by the one or more sensors 114 and tracked by the vehicle computing system 112. The object descriptor 204 can include information and/or data associated with the tracked object 202. For example, the object descriptor 204 can include input data and/or sensor data that indicate the location, position, velocity, acceleration, and/or physical dimensions of the tracked object 202.

The detection 206 can be a sensor output that is based at least in part on the detection of one or more objects in an environment. For example, the detection 206 can be based at least in part on sensor output generated by the one or more sensors 114 that is accessed by the vehicle computing system 112. The detection descriptor 208 can include information and/or data associated with the detection 206. For example, the detection descriptor 208 can include sensor data and/or input data that indicate the location, position, velocity, acceleration, and/or physical dimensions associated with the detection 206.

The object descriptor 204 and/or the detection descriptor 208 can be used as an input to the encoder 210 which is configured access the object descriptor 204 and/or the detection descriptor 208 and generate output including data that can be used as an input to the machine-learned association model 212. In some embodiments, the object descriptor 204 and the detection descriptor 208 can be included in the joint detection and tracking output 220 that is provided as input to the encoder 210. For example, the vehicle computing system 112 can include an encoder that is configured to access the object descriptor 204 and/or the detection descriptor 208 and encode them into a vector. In some embodiments, the vector is a fixed length vector.

The output of the encoder 210 can be used as an input to the machine-learned association model 212 which is configured and/or trained to access the output of the encoder 210, perform one or more operations on the output of the encoder 210, and generate an output of the machine-learned association model 212 that can be received as input by the decoder 214. In some embodiments, the machine-learned association model 212 can include an LSTM model that can generate and update hidden states based on the input into the machine-learned association model 212. The output of the machine-learned association model 212 can be used as an input to the decoder 214.

The decoder 214 can access the output of the machine-learned association model 212 and perform one or more operations to decode the output of the machine-learned association model and generate the association data 222 which can include the association score 216 and the class probability 218. The association score 216 can be associated with the probability or likelihood that the detected object 206 is associated with the object track 202. The class probability 218 can include a prediction of the class of an object associated with the detected object 206 and the probability that the prediction of the class of the object is accurate. For example, the vehicle computing system 112 can use the object descriptor 204, the detection descriptor 208, and an implementation of the machine-learned association model 212 to determine that the detection 206 is associated with the tracked object 202 and that the detection 206 has a ninety percent-five percent probability of being a cyclist (e.g., a person riding a bicycle) and a five percent probability of being a motorcyclist (e.g., a person riding a motorcycle).

Figure 3:
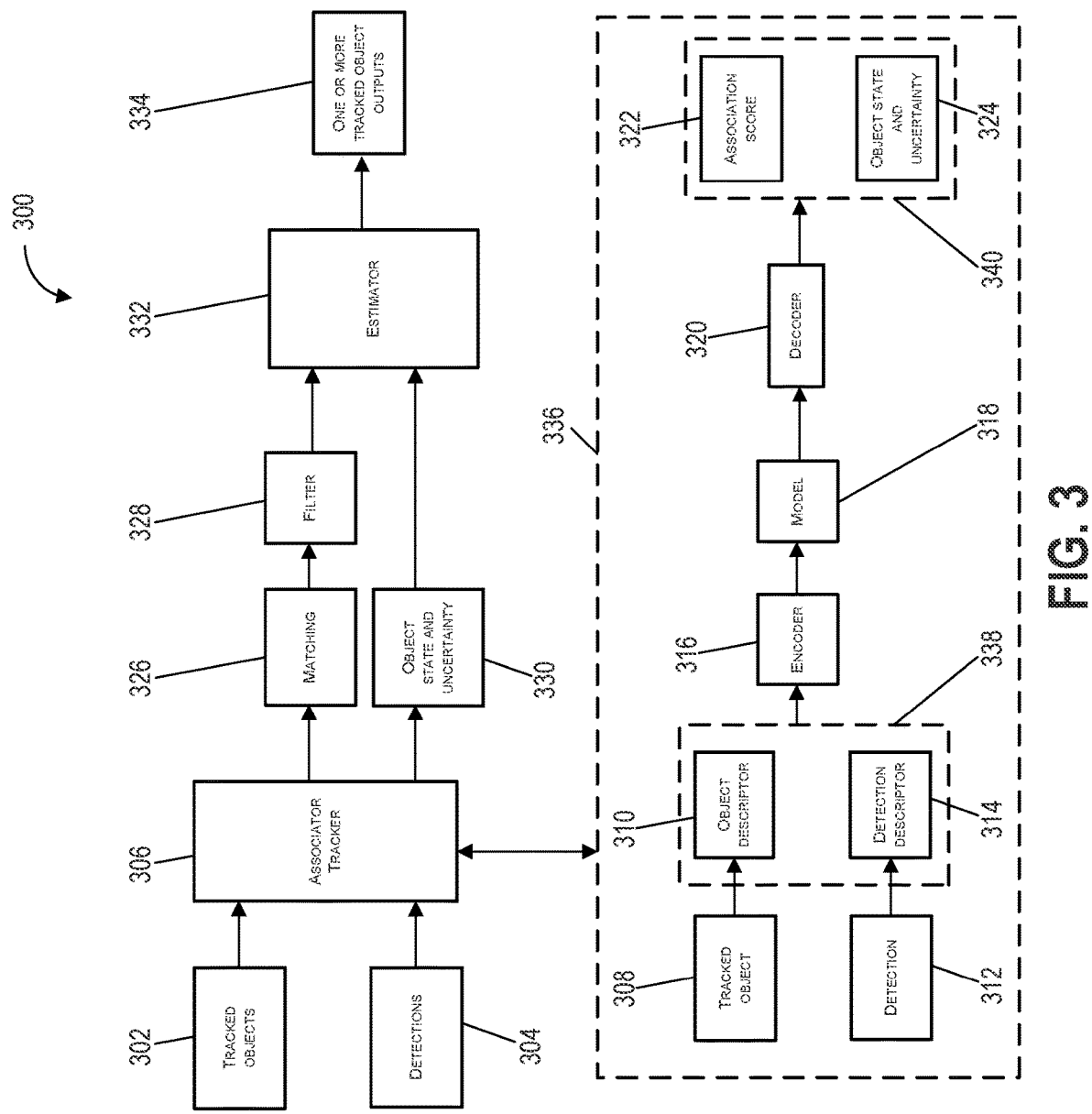
FIG. 3 depicts an example aspect of an association computing system according to example embodiments of the present disclosure.

FIG. 3 depicts a diagram of an example technique for joint association and tracking according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of an association and tracking technique which includes tracked objects 302, detections 304, an association tracker 306, a tracked object 308, an object descriptor 310, a detection 312, a detection descriptor 314, an encoder 316, a machine-learned association model 318, a decoder 320, an association score 322, object state and uncertainty data 324, greedy matching operations 326, a filter 328, object state and uncertainty data 330, an estimator 332, one or more tracked object outputs 334, association and tracking model 336, joint detection and tracking output 338, and association data 340.

The tracked objects 302 can include a set of tracked objects that are being tracked over a plurality of time intervals. The tracked object 308 can be part of the set of tracked objects included in the tracked objects 302. The detections 304 can be a set of sensor outputs that is associated with the detection of one or more objects in an environment that are detected by one or more sensors. For example, the detections 304 can include one or more sensor outputs generated by the one or more sensors 114 for use by the vehicle computing system 112. The tracked objects 302 and the detections 304 can be used as an input to the association tracker 306. The association tracker 306 can include a plurality of models including a plurality of machine-learned association models, each of which can be configured and/or trained to access input associated with the tracked objects 302 and the detections 304. For example, the association tracker can include a plurality of LSTM models, each of which can: receive an object descriptor associated with the state of a tracked object as an input; receive a detection descriptor associated with the sensor outputs based at least in part on detections of an environment as an input; and generate one or more outputs based on the inputs including the object descriptor and/or the detection descriptor. In this example, the association tracker 306 includes the association and tracking model 336 which includes the tracked object 308, the object descriptor 310, the detection 312, the detection descriptor 314, the encoder 316, the machine-learned association model 318, the decoder 320, the association score 322, and the object state and uncertainty data 324.

The tracked objects 302 include the tracked object 308, which is an object that is being tracked over a plurality of time intervals. For example, the tracked object 308 can be a pedestrian in an environment that is detected by the one or more sensors 114 and tracked by the vehicle computing system 112. The object descriptor 310 can include information and/or data associated with the tracked object 308. For example, the object descriptor 310 can include input data and/or sensor data that indicate the location, position, velocity, acceleration, and/or physical dimensions of the tracked object 308.

The detection 312 can be one of the detections 304, which can include sensor output associated with detection by one or more sensors of one or more objects in an environment. The detection descriptor 314 can include information and/or data associated with the detection 312. For example, the detection descriptor 314 can include input data and/or sensor data, based at least in part on one or more sensor outputs that include information associated with the location, position, velocity, acceleration, and/or physical dimensions associated with the detection 312.

The object descriptor 310 and/or the detection descriptor 314 can be used as an input to the encoder 316 which is configured access the object descriptor 310 and/or the detection descriptor 314 and generate output including data that can be used as an input to the machine-learned association model 318. For example, the vehicle computing system 112 can include an encoder that is configured to access the object descriptor 310 and/or the detection descriptor 314 and encode them into a vector. In some embodiments, the vector is a fixed length vector. In some embodiments, the object descriptor 310 and the detection descriptor 314 can be included in the joint detection and tracking output 338 that is provided as input to the encoder 316.

The output of the encoder 316 can be used as an input to the machine-learned association model 318 which is configured and/or trained to access the output of the encoder 316, perform one or more operations on the output of the encoder 316, and generate an output of the machine-learned association model 318 that can be received as input by the decoder 320. In some embodiments, the machine-learned association model 318 can include an LSTM model that can generate and update hidden states based on the input into the machine-learned association model 318. The output of the machine-learned association model 318 can be used as an input to the decoder 320.

In some embodiments, the machine-learned association model 318 can be trained based at least in part on evaluation of the one or more loss functions which can include the total loss function: $\mathcal{L}_{total} = W_a * \mathcal{L}_{association} + 1 W_t * \mathcal{L}_{tracking} + \|\theta\|^2$. The total loss $\mathcal{L}_{total}$ can be based at least in part on an association loss $W_a * \mathcal{L}_{association}$; a tracking loss $W_t * \mathcal{L}_{tracking}$; and a vector norm $\|\theta\|^2$. Further, training the machine-learned association model 318 can include adjusting (e.g., weighting differently) one or more parameters of the machine-learned association model 318 based at least in part on the contributions that each of the one or more parameters make towards minimizing the loss. Minimization of the loss can be positively correlated with more accurate association results in which the association of a detected object with an object track is more similar to a ground-truth association of a detected object with an object track.

The decoder 320 can access the output of the machine-learned association model 318 and perform one or more operations to decode the output of the machine-learned association model and generate the association data 340 which can include the association score 322 and/or the class probability 324. The association score 322 can be associated with the probability or likelihood that a detected object is associated with an object track. For example, the association score 322 can include a numerical value based on a range of values with the lower values being associated with a lower probability or likelihood of a detected object being associated with an object track and higher values being associated with a higher probability or likelihood of a detected object being associated with an object track.

The object state and uncertainty 324 can include a prediction of the state of an object associated with the detected object 312 (e.g., a location, velocity, physical dimensions, and/or acceleration of a detected object) and the probability that the prediction of the state of the object is accurate.

The association score 322 can be used to determine whether the tracked object 308 is associated with the detection 312. The greedy matching operations 326 can be performed on the set of tracked objects 302 and the set of detections 304 that are determined to be associated based at least in part on association scores (e.g., the association score 322). Based at least in part on the greedy matching operations 326, a greedy matching output including the tracked objects 302 and the detections 304 that are associated can be generated and provided to the filter 328.

The filter 328 is configured to determine the state of a detection based on one or more inputs including the greedy matching output generated by the greedy matching operations 326. The filter, which in some embodiments can be an extended Kalman filter, can generate an output that can be provided as an input to the estimator 332.

The estimator 332, which in some embodiments can be an interactive multiple model tracker, can receive the object state and uncertainty data 324 and the output of the filter 328 as inputs that can be used to generate the one or more tracked object outputs 334. The one or more tracked object outputs 334 can include the location, position, velocity, and/or acceleration of a tracked object. In some embodiments, the one or more tracked object outputs 334 can be used as an input to a motion planning system that can use the one or more tracked object outputs 334 to determine the location of tracked objects in an environment.

For example, the vehicle computing system 112 can use the output of the association tracker 306 to generate the one or more tracked object outputs 334 which can include an indication that the detections 304 include an object associated with the detection 312 that has a velocity of twenty meters per second with an uncertainty of plus or minus 1 meter per second, and a height of two meters with an uncertainty of plus or minus twenty centimeters.

Figure 4:
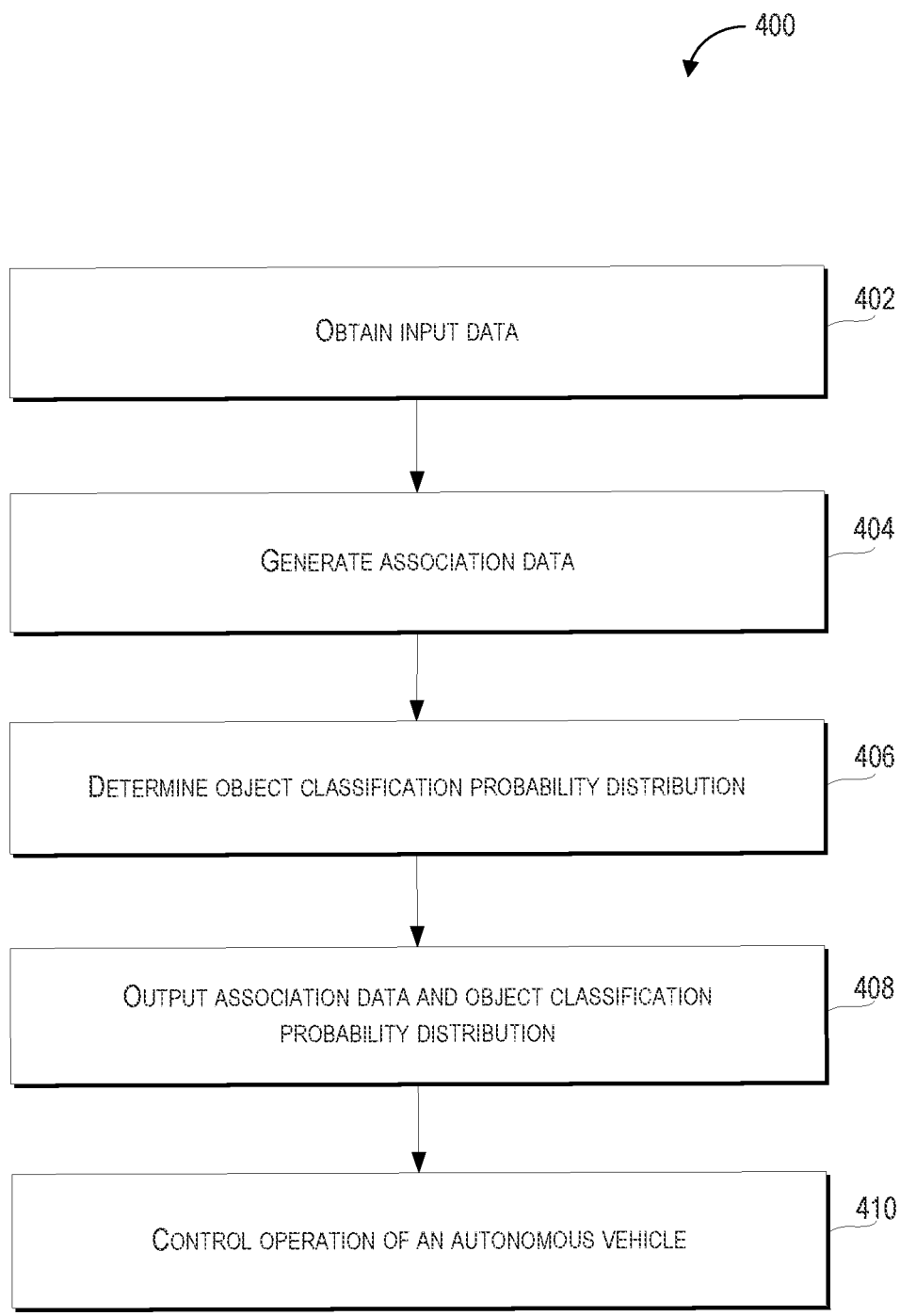
FIG. 4 depicts a flow diagram of an example method of object association and tracking according to example embodiments of the present disclosure.

FIG. 4 depicts a flow diagram of an example method of object association and tracking according to example embodiments of the present disclosure. One or more portions of a method 400 can be implemented by one or more devices (e.g., one or more computing devices) or systems including, for example, the operations computing system 104, the vehicle 108, or the vehicle computing system 112, shown in FIG. 1. Moreover, one or more portions of the method 400 can be implemented as an algorithm on the hardware components of the devices described herein (e.g., as in FIG. 1). Further, one or more portions of the method 400 can include any of the information and/or operations described herein. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, the method 400 can include obtaining, accessing, and/or retrieving data that can include input data. For example, the input data can include information associated with a detected object (e.g., a pedestrian) within a surrounding environment of an autonomous device (e.g., an autonomous vehicle), an initial classification of the detected object (e.g., the detected object is a pedestrian) at an initial time interval, and one or more object tracks indicating location of the detected object (e.g., where the pedestrian walked) over a plurality of time intervals preceding the initial time interval (e.g., the preceding five seconds).

In some embodiments, the input data can include a feature vector associated with one or more features of one or more detected objects including the detected object; and/or the one or more object tracks. The one or more features can include one or more velocities of the one or more objects, one or more accelerations of the one or more objects, one or more headings of the one or more objects, one or more physical dimensions of the one or more objects, and/or one or more durations that the one or more objects are detected.

Furthermore, the one or more features can include one or more distances from an object track to the object track that was detected at the preceding time interval and/or one or more durations from the most recent time interval at which an object track was detected and the preceding time interval at which the object track was detected.

At 404, the method 400 can include generating association data. The association data can be generated based at least in part on the input data and/or one or more machine-learned models. The association data can include information associated with one or more relationships between the detected object and the one or more object tracks including the location, velocity, acceleration, and orientation of the detected object relative to the one or more object tracks over the plurality of time intervals. For example, the association data can include information indicating showing the degree of similarity between the location, velocity, acceleration, and/or orientation of detected object and nearby object tracks.

In some embodiments, the input data can be used an input that is provided to the one or more machine-learned models (e.g., one or more machine-learned association models). For example, the input data can include a feature vector that is provided as an input to the one or more machine-learned models which have been configured and/or trained to receive the input data and generate an output including the association data.

The one or more machine-learned models can include a plurality of layers. Each of the plurality of layers of the one or more machine-learned models can: receive an input (e.g., receive the input data, which can include information associated with a detected object as input for the first layer and one or more feature maps as input for the remaining layers subsequent to the first layer); perform some operations on the input (e.g., evaluate one or more variables and/or aspects of the input based at least in part on one or more parameters associated with classification and/or association of detected objects and/or object tracks); and generate an output based on the operations performed on the input (e.g., generate association data including information associated with whether a detected object is associated with an object track).

In some embodiments, multiple objects can be detected and/or tracked, and each of the detected objects and/or object tracks can be associated with a corresponding one of the one or more machine-learned models. For example, when three objects are detected, the vehicle computing system 112 can generate input data associated with the three detected objects that can be input into three separate instances of the one or more machine-learned models respectively. Further, each of the three separate instances of the one or more machine-learned models can generate its own output, such that there will be three sets of association data, each set of association data corresponding to a different one of the detected object. Any combination of the three sets of association data can then be used to determine another set of association data.

In some embodiments, any of the one or more machine-learned models can include one or more features and/or capabilities of the machine-learned association models described herein (e.g., the machine learned association model 212 and/or the machine-learned association model 318).

At 406, the method 400 can include determining an object classification probability distribution that can be based at least in part on the association data. For example, the vehicle computing system 112 can use the association data to determine that a detected object has a ninety percent probability of being a cyclist, a four percent probability of being a motorcyclist, and a one percent probability of being a pedestrian.

In some embodiments, the object classification probability distribution can be determined when the association data indicates that the detected object is associated with at least one of the object tracks. For example, the object classification probability distribution can be determined by the vehicle computing system 112 when a detected object is associated with one object track and the vehicle computing system 112 can forego determining the object classification probability when the detected object is not associated with any object tracks.

At 408, the method 400 can include outputting the association data and/or the object classification probability distribution for the detected object. In some embodiments, the association data and/or the object classification probability distribution for the detected object can be in outputted in a data format that can be displayed and/or read. For example, an object classification probability distribution output to a display device can include English text describing object classes and respective numerical values indicating the probability that a detected object belongs to each respective object class.

In some embodiments, the association data and/or the object classification probability distribution for the detected object can be outputted in a data format that can be used by a computing system to perform one or more operations. For example, the vehicle computing system 112 can generate association data in a format that can be used by various computing systems used to operate an autonomous vehicle including a motion prediction system that is used to predict the motion of objects around the autonomous vehicle.

At 410, the method 400 can include controlling operation of a device (e.g., an autonomous vehicle). In some embodiments, controlling operation of the device can be based at least in part on the association data, the object classification probability distribution for the detected object, and/or one or more tracked object outputs.

In some embodiments, controlling operation of a device can include controlling one or more autonomous vehicle systems associated with operation of an autonomous vehicle. The one or more autonomous vehicle systems can include one or more engine systems, one or more motor systems, one or more steering systems, one or more braking systems, one or more electrical systems, and/or one or more communications systems. For example, the vehicle computing system 112 can use the association data to determine the paths of objects in the environment traversed by the vehicle 108. The vehicle computing system 112 can then control engine systems and braking systems of the vehicle 108 to maneuver and control the velocity of the vehicle 108 as the vehicle 108 navigates around the paths of detected objects.

In some embodiments, controlling operation of the device can include planning a motion of the autonomous vehicle based at least in part on the one or more future locations of the detected object. For example, the association data can be used by the vehicle computing system 112 to determine a motion plan including a travel path for the vehicle 108 that avoids intersecting the detected object and/or a predicted path based on the one or more object tracks.

Figure 5:
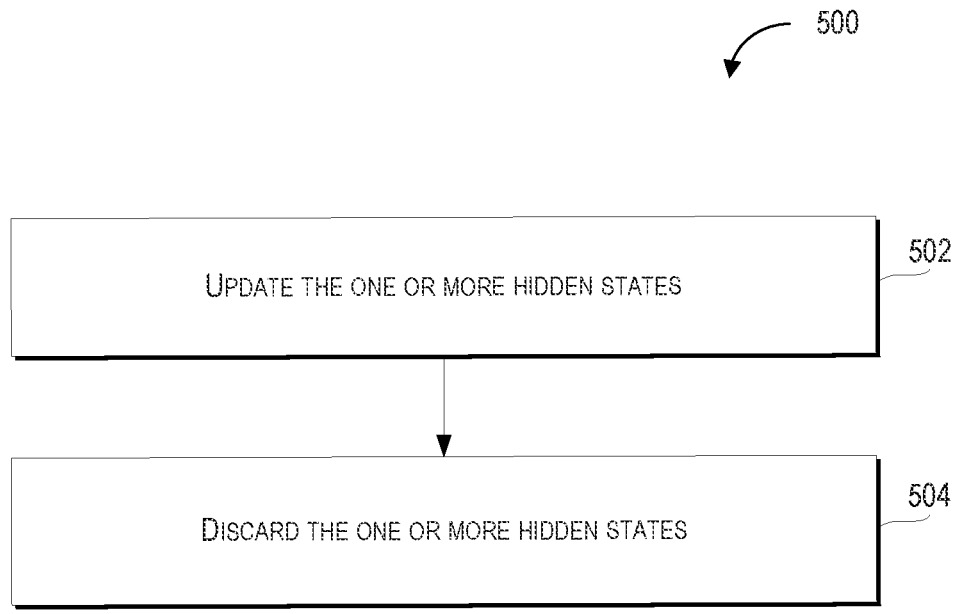
FIG. 5 depicts a flow diagram of an example method of object association and tracking according to example embodiments of the present disclosure.

FIG. 5 depicts a flow diagram of an example method of object association and tracking according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1). In some embodiments, one or more portions of the method 500 can be performed as part of the method 400 that is depicted in FIG. 4. Further, one or more portions of the method 500 can include any of the information and/or operations described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include updating the one or more hidden states when the detected object is determined to be associated with at least one of the one or more object tracks.

At 504, the method 500 can include discarding the one or more hidden states when the detected object is not determined to be associated with at least one of the one or more object tracks. For example, the one or more hidden states can be stored in a memory device until the detected object is determined not to be associated with at least one of the one or more object tracks, at which time the one or more hidden states are discarded (e.g., deleted or erased from the memory device).

Figure 6:
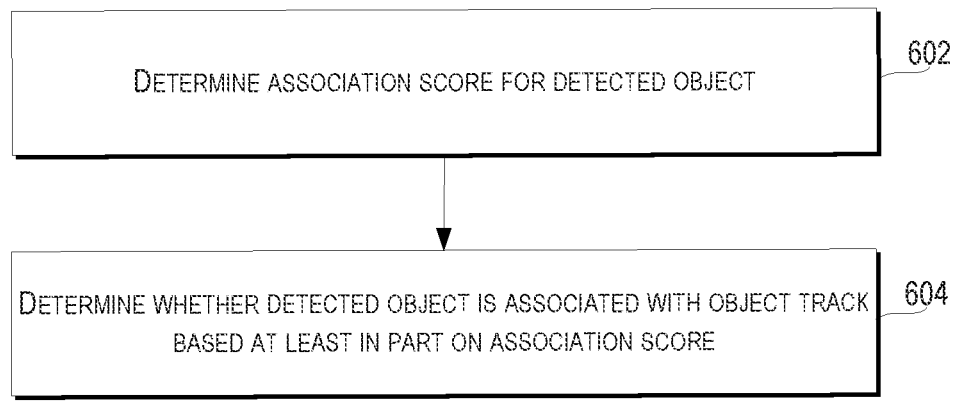
FIG. 6 depicts a flow diagram of an example method of object association and tracking according to example embodiments of the present disclosure.

FIG. 6 depicts a flow diagram of an example method of object association and tracking according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1). In some embodiments, one or more portions of the method 600 can be performed as part of the method 400 that is depicted in FIG. 4. Further, one or more portions of the method 600 can include any of the information and/or operations described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining an association score for the detected object.

In some embodiments, the one or more association scores can be based at least in part of the one or more features of the detected object. Further, the one or more features of the detected object can be weighted so that some of the one or more features are weighted more heavily than others. The determination of whether a detected object is associated with an object track can be based at least in part on the extent or degree to which one or more features of a detected object are similar to one or more features of an object track. Further, the similarity of a detected object to an object track can be associated with the probability or likelihood that a detected object is associated with an object track.

At 604, the method 600 can include determining whether the detected object is associated with at least one of the object tracks based at least in part on the association score. For example, the vehicle computing system 112 can determine the detected object that is associated with at least one of the one or more object tracks based at least in part on the performance of one or more operations associated with the one or more association scores.

Figure 7:
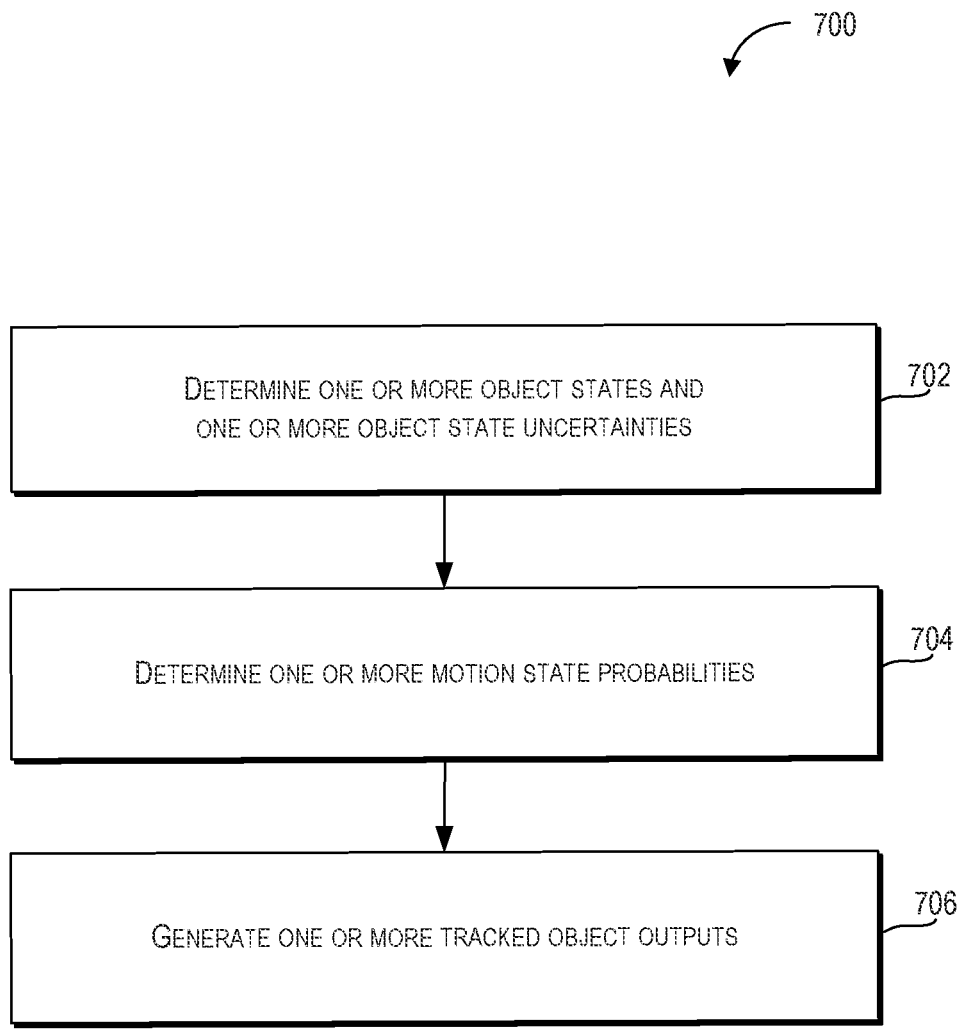
FIG. 7 depicts a flow diagram of an example method of object association and tracking according to example embodiments of the present disclosure.

FIG. 7 depicts a flow diagram of an example method of object association and tracking according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1). In some embodiments, one or more portions of the method 700 can be performed as part of the method 400 that is depicted in FIG. 4. Further, one or more portions of the method 700 can include any of the information and/or operations described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining one or more object states and/or one or more object state uncertainties for the detected object based at least in part on the association data for the detected object.

At 704, the method 700 can include determining one or more motion state probabilities for the detected object.

In some embodiments, the one or more motion state probabilities for the detected object can be determined based at least in part on one or more changes in the one or more object tracks over the plurality of time intervals. For example, the changes in location of the one or more object tracks associated with the detected object can be used to determine acceleration and/or velocity of the detected object, and in turn, the one or more motion state probabilities.

In some embodiments, the one or more motion state probabilities of an object can be determined based at least in part on the difference between the motion state associated with the detected object at a current time interval and a past estimate of the motion state associated with the detected object at a previous time interval; and outputs one or more motion state probabilities, each motion state probability being associated with a motion state of an object (e.g., stationary, cruising, or maneuvering) and the probability that the motion state of the object is accurate.

At 706, the method 700 can include generating one or more tracked object outputs based at least in part on the one or more object states, one or more object state uncertainties, and/or the one or more motion state probabilities.

Figure 8:
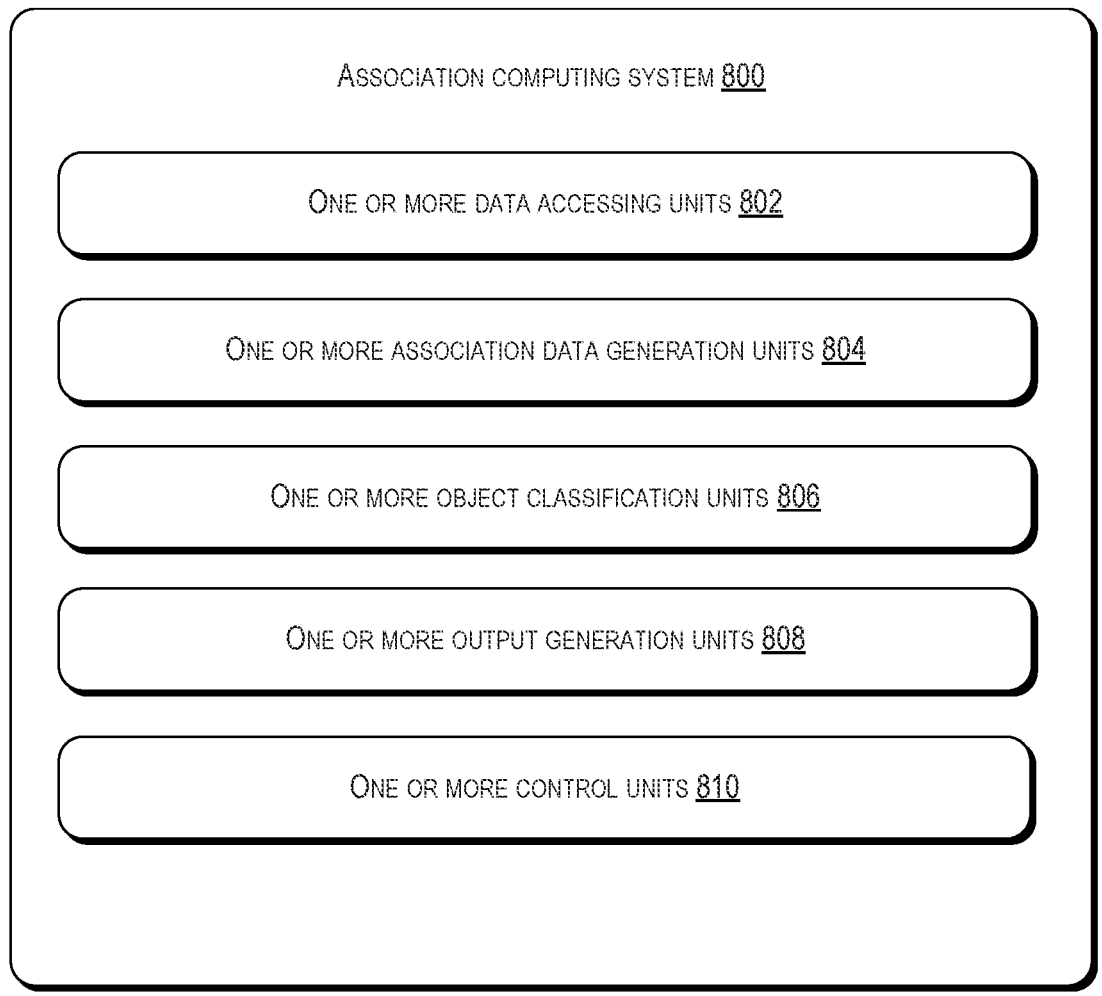
FIG. 8 depicts a diagram of an example system according to example embodiments of the present disclosure.

FIG. 8 depicts an example of an association and tracking system according to example embodiments of the present disclosure. One or more operations and/or functions in FIG. 8 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 8 can include one or more features of one or more devices and/or systems including, for example, the operations computing system 104, the vehicle 108, or the vehicle computing system 112, which are depicted in FIG. 1.

Various means can be configured to perform the methods and processes described herein. For example, an association computing system 800 can include one or more data accessing units 802, one or more association data generation units 804, one or more object classification units 806, one or more output generation units 808, one or more control units 810, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate an association computing system) or configured (e.g., an ASIC custom designed and configured to operate an association computing system) to perform one or more algorithms for performing the operations and functions described herein. For example, the means (e.g., the one or more data accessing units 802) can be configured to obtain input data. The input data can be indicative of a detected object. The detected object can be within a surrounding environment of an autonomous vehicle. The input data can be indicative of an initial object classification of the detected object at an initial time interval and one or more object tracks at a plurality of time intervals preceding the initial time interval.

The means (e.g., the one or more association data generation units 804) can be configured to generate association data. The association data can be based at least in part on the input data and/or one or more machine-learned models. The association data can indicate whether the detected object is associated with at least one of the one or more object tracks.

In some embodiments, the one or more association data generation units 804 can be configured to update the one or more hidden states when the detected object is determined to be associated with at least one of the one or more object tracks.

In some embodiments, the one or more association data generation units 804 can be configured to discard the one or more hidden states when the detected object is not determined to be associated with at least one of the object tracks.

In some embodiments, an association score can be included in the association data or determined based at least in part on the association data.

In some embodiments, the one or more association data generation units 804 can be configured to determine the association score based at least in part on proximity of the detected object to each of the one or more object tracks. The proximity of the detected object to each of the one or more object tracks can be positively correlated with the association score.

In some embodiments, the one or more association data generation units 804 can be configured to update the one or more hidden states when the association score is above a threshold. Further, discarding the one or more hidden states can include discarding the one or more hidden states when the association score is below a threshold.

In some embodiments, the one or more association data generation units 804 can be configured to determine whether the detected object is associated with at least one of the object tracks based at least in part on the association score.

The means (e.g., the one or more object classification units 806) can be configured to determine an object classification probability distribution. The object classification probability distribution can be based at least in part on the association data. The object classification probability distribution can indicate, for a plurality of object classifications, a probability that the detected object is associated with each respective object classification.

In some embodiments, the one or more object classification units 806 can be configured to determine one or more object states and/or one or more object state uncertainties for the detected object based at least in part on the association data for the detected object.

In some embodiments, the one or more object classification units 806 can be configured to determine one or more motion state probabilities for the detected object. Each of the one or more motion state probabilities can be associated with a probability that a detected object is associated with a motion state including at least one of a stationary state in which the velocity associated with an detected object is zero over the plurality of time intervals, a cruising state in which the velocity associated with a detected object is constant over the plurality of time intervals, and/or a maneuvering state in which the acceleration associated with a detected object varies over the plurality of time intervals.

The means (e.g., the one or more output generation units 808) can be configured to output the association data and/or the object classification probability distribution for the detected object.

In some embodiments, the one or more one or more output generation units 808 can be configured to generate one or more tracked object outputs based at least in part on the one or more object states, one or more object state uncertainties, and/or the one or more motion state probabilities.

The means (e.g., the one or more control units 810) can be configured to control an operation of the autonomous vehicle. The control of the autonomous vehicle can be based at least in part on the association data and/or the object classification probability distribution.

In some embodiments, controlling, by the one or more control units 810, operation of an autonomous vehicle can include determining one or more future locations of the detected object based at least in part on the tracked object output.

In some embodiments, controlling, by the one or more control units 810, operation of an autonomous vehicle can include planning a motion of the autonomous vehicle based at least in part on the one or more future locations of the detected object.

In some embodiments, the one or more control units 810 can be configured to control an operation of the autonomous vehicle based at least in part on the one or more tracked object outputs.

Figure 9:
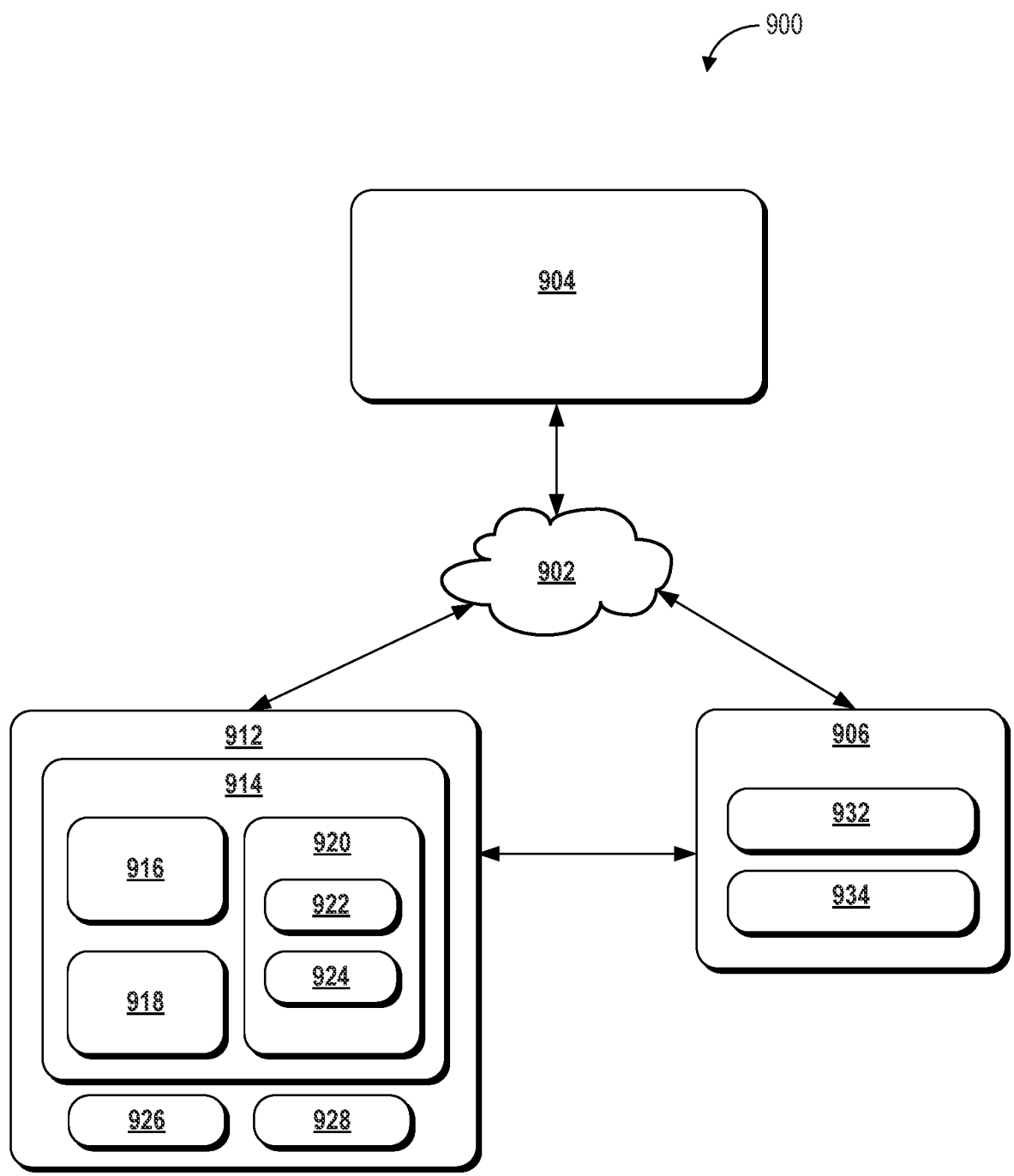
FIG. 9 depicts a diagram of an example system according to example embodiments of the present disclosure.

FIG. 9 depicts a diagram of an example system according to example embodiments of the present disclosure. A system 900 can include a network 902 which can include one or more features of the communications network 102 depicted in FIG. 1; an operations computing system 904 which can include one or more features of the operations computing system 104 depicted in FIG. 1; one or more remote computing devices 906 which can include one or more features of the one or more remote computing devices 106 depicted in FIG. 1; a vehicle computing system 912 which can include one or more features of the vehicle computing system 112 depicted in FIG. 1; one or more computing devices 914; a communication interface 916; one or more processors 918; one or more memory devices 920; memory system 922; memory system 924; one or more input devices 926; one or more output devices 928; one or more input devices 932; and one or more output devices 934.

The vehicle computing system 912 can include the one or more computing devices 914. The one or more computing devices 914 can include one or more processors 918 which can be included on-board a vehicle including the vehicle 108 and one or more memory devices 920 which can be included on-board a vehicle including the vehicle 108. The one or more processors 918 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 918 can include a single processor or a plurality of processors that are operatively and/or selectively connected. The one or more memory devices 920 can include one or more non-transitory computer-readable storage media, such as RAM, ROM, EEPROM, EPROM, flash memory devices, magnetic disks, and/or combinations thereof.

The one or more memory devices 920 can store data or information that can be accessed by the one or more processors 918. For instance, the one or more memory devices 920 which can be included on-board a vehicle including the vehicle 108, can include a memory system 922 that can store computer-readable instructions that can be executed by the one or more processors 918. The memory system 922 can include software written in any programming language that can be implemented in hardware (e.g., computing hardware). Further, the memory system 922 can include instructions that can be executed in logically and/or virtually separate threads on the one or more processors 918. The memory system 922 can include any set of instructions that when executed by the one or more processors 918 cause the one or more processors 918 to perform operations.

For example, the one or more memory devices 920 which can be included on-board a vehicle (e.g., the vehicle 108) can store instructions, including specialized instructions, that when executed by the one or more processors 918 on-board the vehicle cause the one or more processors 918 to perform operations such as any of the operations and functions of the one or more computing devices 914 or for which the one or more computing devices 914 are configured, including any of the operations performed by the vehicle computing system 112 and/or any other operations and/or functions for operation of a vehicle, as described in the present disclosure.

The one or more memory devices 920 can include a memory system 924 that can store data that can be retrieved, manipulated, created, and/or stored by the one or more computing devices 914. The data stored in memory system 924 can include, for instance, the input data and/or training data described herein. Furthermore, the data stored in the memory system 924 can include one or more machine-learned models that have been configured and/or trained to generate an output based at least in part on an input provided to the one or more machine-learned models. For example, the one or more machine-learned models stored in the memory system 924 can include one or more convolutional neural networks, one or more residual convolutional neural networks, one or more recurrent neural networks (e.g., LSTM network), and/or one or more recursive neural networks. Further, the one or more machine-learned models stored in the memory system 924 can include the one or more machine-learned models described herein.

The data that is stored in the memory system 924 can also include data associated with one or more states of one or more objects detected by one or more sensors (e.g., the one or more sensors 114 of the vehicle 108 that is described in the method 100 that is depicted in FIG. 1); data associated with one or more states of a device associated with the operations and/or functions of the vehicle computing system 912, the operations computing system 904, and/or the one or more remote computing devices 906; data generated by any of the computing systems (e.g., the vehicle computing system 112) and/or computing devices involved in the determination of whether a detected object is associated with one or more object tracks as described herein; data associated with user input; data associated with one or more actions and/or control command signals; data associated with users; the input data described herein; and/or other data or information. The data in the memory system 924 can be stored in one or more databases. The one or more databases can be split up so that the one or more databases are located in multiple locales on-board a vehicle which can include the vehicle 108. In some implementations, the one or more computing devices 914 can obtain data from one or more memory devices that are remote from a vehicle, including, for example the vehicle 108.

The system 900 can include the network 902 (e.g., a communications network) which can be used to send and/or receive signals (e.g., electronic signals) or data (e.g., data from a computing device) including signals or data exchanged between computing devices including the operations computing system 904, the one or more remote computing devices 906, and/or the vehicle computing system 912. The network 902 can include any combination of various wired (e.g., twisted pair cable) and/or wireless communication mechanisms (e.g., cellular, wireless, satellite, microwave, and radio frequency) and/or any desired network topology (or topologies). For example, the communications network 902 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 914 can also include the communication interface 916 used to communicate with one or more other systems which can be included on-board a vehicle including the vehicle 108 (e.g., over the network 902). The communication interface 916 can include any suitable components for interfacing with one or more networks, including for example, transmitters, receivers, ports, controllers, antennas, other hardware and/or software.

The vehicle computing system 912 can also include one or more input devices 926 and/or one or more output devices 928. The one or more input devices 926 and/or the one or more output devices 928 can be included and/or otherwise associated with a human-machine interface system. The one or more input devices 926 can include, for example, hardware for receiving information from a user, such as a touch screen, touch pad, mouse, a keyboard, data entry keys, and/or a microphone that can be configured to be suitable for voice recognition. The one or more output devices 928 can include one or more display devices (e.g., LCD, OLED, plasma, and/or CRT); a projector device that can project images onto a surface; and/or one or more audio output devices (e.g., loudspeakers). The one or more output devices 928 can be used to facilitate communication with a user. For example, a human operator (e.g., associated with a service provider) can communicate with a current user of a vehicle including the vehicle 108 via at least one of the display devices and/or the audio output devices.

The operations computing system 904 can include one or more computing devices configured to perform one or more operations associated with operating one or more services. The one or more services can include one or more transportation services, courier services, and/or delivery services. Furthermore, the operations computing system 904 can include one or more processors and one or more memory devices that can be used to store data including the input data, the sensor data, the training data, and/or one or more machine-learned models that are stored in the memory system 924.

The one or more remote computing devices 906 can include various types of computing devices. For example, the one or more remote computing devices 906 can include a telephone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 906 can be associated with a user. The one or more remote computing devices 906 described herein can also be representative of a user device that can be included in the human machine interface system of a vehicle including the vehicle 108.

The one or more remote computing devices 906 can include one or more input devices 932 and/or one or more output devices 934. The one or more input devices 932 can include, for example, hardware for receiving information from a user, such as a touch screen, touch pad, mouse, data entry keys, speakers, and/or a microphone suitable for voice recognition. The one or more output devices 934 can include hardware for providing content for display. For example, the one or more output devices 934 can include a display device (e.g., display screen, CRT, LCD), which can include hardware for a user interface.

Furthermore, the one or more remote computing devices 906 can include one or more processors and one or more memory devices which can be used to store data including the input data, the sensor data, the training data, and/or the one or more machine-learned models that are stored in the memory system 924.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system for an autonomous vehicle, the autonomous vehicle control system comprising:
   one or more processors; and
   a memory comprising one or more tangible non-transitory computer-readable media, the memory storing computer-readable instructions that are executable by the one or more processors to cause the autonomous vehicle control system to perform operations, the operations comprising:
      obtaining sensor data indicative of an object within a surrounding environment of an autonomous vehicle;
      obtaining an input object track descriptive of the object, wherein obtaining the input object track descriptive of the object comprises determining an association between the input object track and the sensor data, wherein the association corresponds to a probability that the object is associated with the input object track;
      generating, using a machine-learned model and based at least in part on the input object track and the sensor data, a tracked object output; and
      controlling an operation of the autonomous vehicle based at least in part on the tracked object output.

2. The autonomous vehicle control system of claim 1, wherein the input object track is descriptive of the object over a plurality of time intervals.

3. The autonomous vehicle control system of claim 1, wherein generating the tracked object output comprises:
   inputting, to the machine-learned model, the input object track and the sensor data; and
   receiving, as an output from the machine-learned model, the tracked object output.

4. The autonomous vehicle control system of claim 1, wherein the tracked object output comprises an object classification.

5. The autonomous vehicle control system of claim 1, wherein the tracked object output comprises at least one of a velocity of the object, an acceleration of the object, a location of the object, an orientation of the object, a position of the object, or a physical dimension of the object.

6. The autonomous vehicle control system of claim 1, wherein the tracked object output comprises an updated location of the object, the updated location being updated relative to the input object track.

7. The autonomous vehicle control system of claim 1, wherein the operations further comprise:
   determining an object classification probability distribution for the object.

8. The autonomous vehicle control system of claim 7, wherein the object classification probability distribution is based at least in part on a motion of the object that corresponds to an object classification, wherein the motion is indicative of a velocity, an acceleration, or a pattern of movement corresponding to the object classification.

9. A non-transitory computer-readable medium storing computer-readable instructions that are executable by one or more processors to perform operations, the operations comprising:
obtaining sensor data indicative of an object within a surrounding environment of an autonomous vehicle;
obtaining an input object track descriptive of the object, wherein obtaining the input object track descriptive of the object comprises determining an association between the input object track and the sensor data, wherein the association corresponds to a probability that the object is associated with the input object track;
generating, using a machine-learned model and based at least in part on the input object track and the sensor data, a tracked object output; and
controlling an operation of the autonomous vehicle based at least in part on the tracked object output.

10. The computer-readable medium of claim 9, wherein the input object track is descriptive of the object over a plurality of time intervals.

11. The computer-readable medium of claim 9, wherein generating the tracked object output comprises:
inputting, to the machine-learned model, the input object track and the sensor data; and
receiving, as an output from the machine-learned model, the tracked object output.

12. The computer-readable medium of claim 9, wherein the tracked object output comprises an object classification.

13. The computer-readable medium of claim 9, wherein the tracked object output comprises at least one of a velocity of the object, an acceleration of the object, a location of the object, a position of the object, or a physical dimension of the object.

14. The computer-readable medium of claim 9, wherein the operations further comprise:
determining an object classification probability distribution for the object.

15. The computer-readable medium of claim 14, wherein the object classification probability distribution is based at least in part on a motion of the object that corresponds to an object classification, wherein the motion is indicative of a velocity, an acceleration, or a pattern of movement corresponding to the object classification.

16. A computer-implemented method, comprising:
obtaining sensor data indicative of an object within a surrounding environment of an autonomous vehicle;
obtaining an input object track descriptive of the object, wherein obtaining the input object track descriptive of the object comprises determining an association between the input object track and the sensor data, wherein the association corresponds to a probability that the object is associated with the input object track;
generating, using a machine-learned model and based at least in part on the input object track and the sensor data, a tracked object output; and
controlling an operation of the autonomous vehicle based at least in part on the tracked object output.

17. The computer-implemented method of claim 16, wherein the input object track is descriptive of the object over a plurality of time intervals.

18. The computer-implemented method of claim 16, wherein generating the tracked object output comprises:
inputting, to the machine-learned model, the input object track and the sensor data; and
receiving, as an output from the machine-learned model, the tracked object output.

19. The computer-implemented method of claim 16, wherein the tracked object output comprises an object classification.

20. The computer-implemented method of claim 16, wherein the tracked object output comprises at least one of a velocity of the object, an acceleration of the object, a location of the object, an orientation of the object, a position of the object, or a physical dimension of the object.

21. The computer-implemented method of claim 16, wherein the tracked object output comprises an updated location of the object, the updated location being updated relative to the input object track.

* * * * *